April 2, 1946.  C. F. KRAMER ET AL  2,397,791
AMPHIBIOUS VEHICLE
Filed Jan. 8, 1943  4 Sheets-Sheet 1
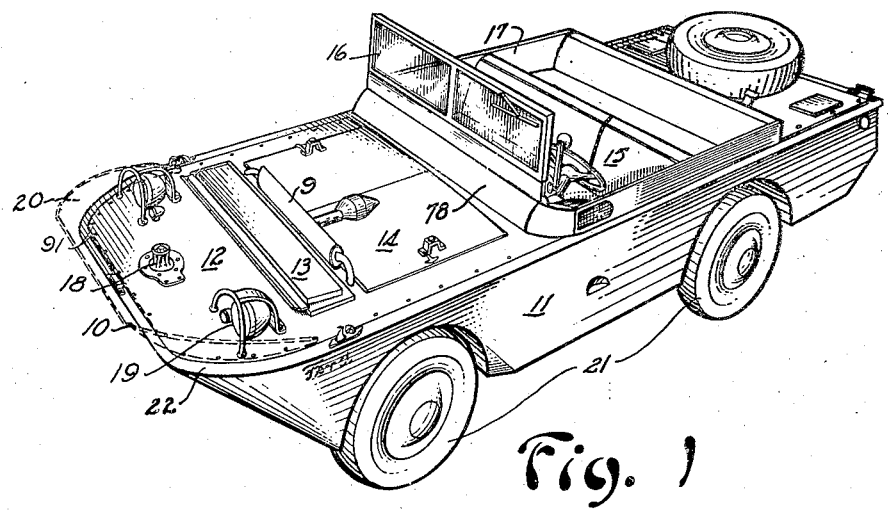
Fig. 1
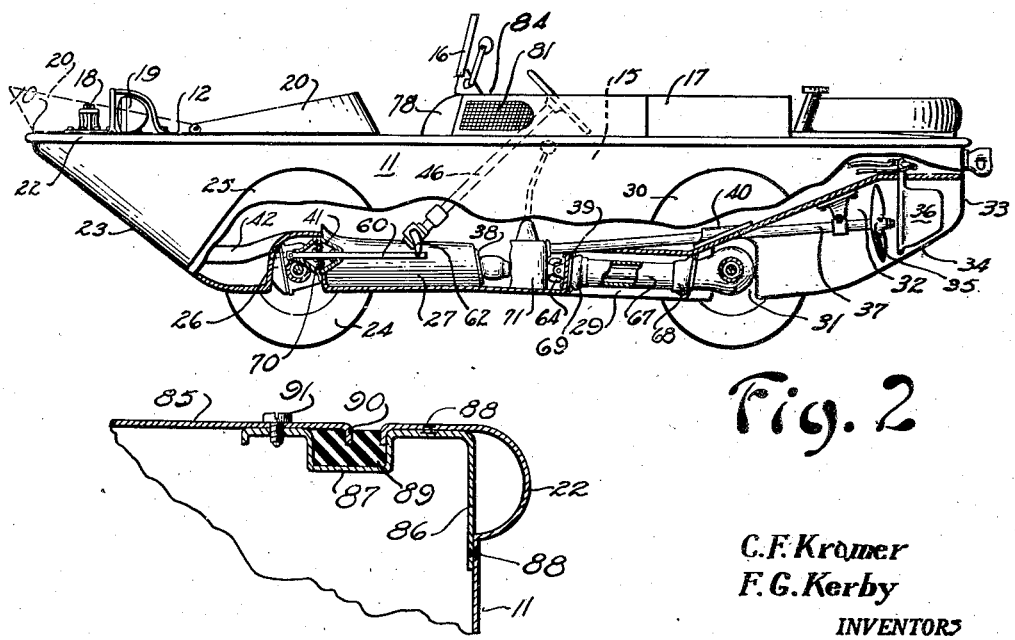
Fig. 2
Fig. 3
C. F. Kramer
F. G. Kerby
INVENTORS April 2, 1946.  C. F. KRAMER ET AL  2,397,791
AMPHIBIOUS VEHICLE
Filed Jan. 8, 1943  4 Sheets-Sheet 2

C.F. Kramer
F.G. Kerby
INVENTORS

C. F. Kramer
F. G. Kerby
INVENTORS

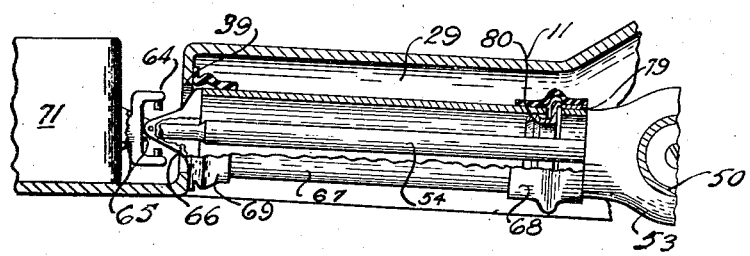
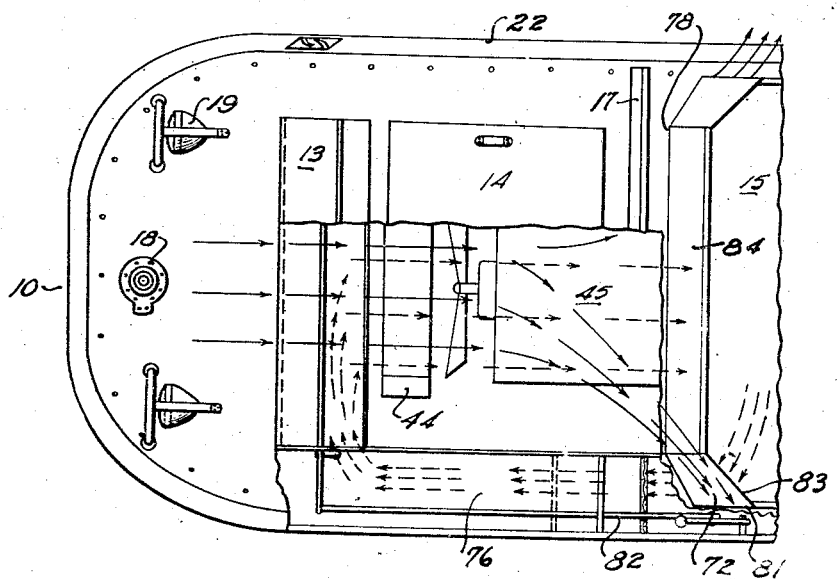

Patented Apr. 2, 1946

2,397,791

UNITED STATES PATENT OFFICE 2,397,791

AMPHIBIOUS VEHICLE

Clarence F. Kramer, Birmingham, and Floyd G. Kerby, Detroit, Mich., assignors to Ford Motor Company, Dearborn, Mich., a corporation of Delaware Application January 8, 1943, Serial No. 471,714

9 Claims. (Cl. 115—1)

This invention relates to motor vehicles; and, more particularly, to vehicles designed for operation on either land or in the water and is directed both to the vehicle itself and certain features of its construction, as well as to the methods to be followed in constructing such vehicle.

The amphibious vehicle described in this application is intended primarily as a military unit and, as such, extended comments on its advantages or uses are hardly necessary. Many vehicles of this type have been proposed in the past and some have been constructed, but none has been entirely practicable from the combined standpoint of military efficiency and high-production manufacture.

The advantages of a vehicle of this invention number, among others, extreme seaworthiness, speed of operation, maneuverability and speed in either water or on land. As a corollary of the land feature, important changes have been made in the construction which contribute to comfort and safety of personnel during land operation and to service and durability under all conditions. Another advantage is to be found in the hull form disclosed, with particular reference to the facility of the vehicle in negotiating rough terrain which heretofore has required track rather than wheel vehicles.

The advantages which follow from the method used are that the entire construction of the device is rationalized and laid out with the prime purpose of achieving a construction which is superior from the standpoints of strength and operating efficiency and yet which may be assembled speedily by modern production methods. In this it departs from the conventional practice in which an amphibious vehicle was either a land vehicle converted for marine use or a boat with added wheels which permitted its use on land. Rather, an integrated structure is shown which departs basically from conventional methods of manufacture to give an integrated structure equally suitable for land or aquatic use.

With these and other objects in view, the invention consists in the arrangement, construction and combination of the various parts of the improved device, as described in the specification, claimed in the claims and illustrated in the accompanying drawings, in which:

Figure 1 is a perspective view of the amphibious vehicle.

Figure 2 is an elevation of the vehicle, a portion of the hull being cut away to show the interior arrangement.

Figure 3 is a partial section on an enlarged scale through the rail of the vehicle.

Figure 4:
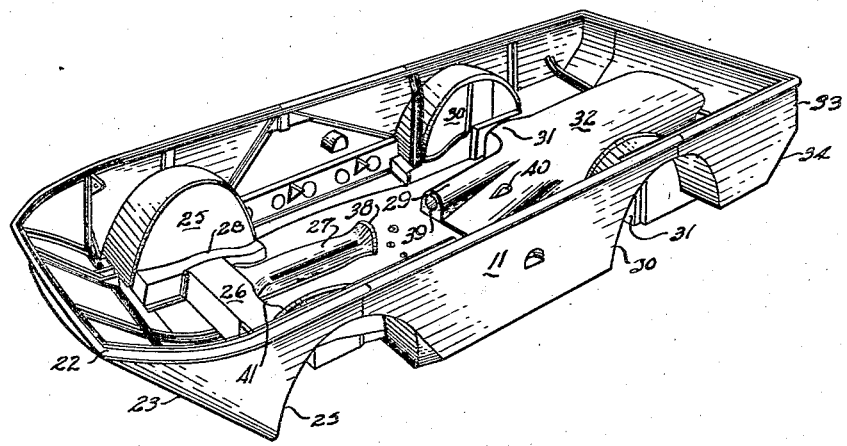

Figures 4 to 7, inclusive, show these various components making up the assembly at the various stages prior to the completion of the vehicle shown in Figure 1.

Figure 8 is a detail, on a larger scale, of the drive-shaft construction shown in Figure 2.

Figure 9 is a plan view of the forward end of the vehicle, largely diagrammatic, showing the provision made for the cooling air flow.

Referring to Figure 1, the reference to character 10 indicates generally the amphibious vehicle which has a hull 11, forward deck 12, cooling air hatch 13, engine hatches 14, selectively positioned surf shield 20, muffler 9, and a cockpit 15 additionally protected by the windshield 16 and coaming 17. In addition, it is fitted with a capstan 18, road lights 19, fuel filler neck, the customary wheel running gear 21, the entire hull being surrounded by the rail 22.

Reference now to Figures 2 and 4 will show some of the details of the construction of the hull 11 which is best referred to as scow-shaped. Thus, the hull has squared off ends and the broad forefoot section 23 which extends downwardly and rearwardly to form the necessary bow rake is substantially a plane surface extending entirely across the vehicle rather than sharply curved longitudinally and V-shaped transversely as is customary in most hulls. Moreover, it will be noted that this plane extended just intersects the lower surface of the front tire 24. This permits the vehicle to attack successfully, utilizing 4-wheel traction, any initial gradient up to and including that defined by the angle of the forefoot plane. Moreover, by extending the forefoot, it permits the vehicle to attack and overcome any vertical obstacle with 2-wheel traction which is not higher than the forward end of the forefoot. These latter obstacles are overcome by running the forefoot upon them and engaging the rear wheels, the entire forefoot acting as an inclined plane and the vehicle being pushed thereon until the forward wheels can engage and exert traction. It is for this reason that the under surface of the forefoot is preferably plain, both longitudinally and transversely.

Continuing rearwardly, there are the two wheel wells 25 and, running between them, the front axle well 26 which is connected to the forward drive-shaft well 27, running longitudinally of the boat. Adjacent each wheel well 25 is the spring well 28 which accommodates the vehicle springs. Continuing aft is the rear drive-shaft well 29, the rear wheel well 30, the rear axle well 31 and the propeller tunnel 32.

The transom 33 is substantially vertical but there is an intermediate section 34 between it and the bottom of the hull which follows a similar linear disposition as the forefoot (reversed in direction to obtain stern rake) referred to above and for the same purpose. Reference to Figure 2 will show that the propeller 35 is fully protected within the propeller tunnel 32, as is the rudder 36 disposed behind it. At the same time, as will be clear from Figure 4, the propeller tunnel proper starts well forward of the point where the propeller shaft 37 traverses the hull so that a propeller stream of maximum efficiency under the circumstances is obtained.

The hull, then, as shown in Figure 4, represents a number of stampings welded or riveted together with appropriate reinforcing members and may be constructed as a unit with but four essential openings through which the moving parts must pass—namely, a front axle drive port 38, rear axle drive port 39, propeller shaft stuffing box 40 and radius rod port 41 through which passes the steering linkage 60.

Figure 5:
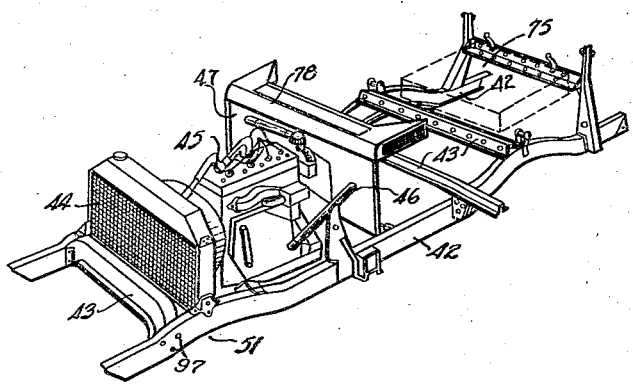

The frame 51 proper is shown in Figure 5 and also is preferably constructed separately as a unit. This includes the longitudinal frame members 42, the transverse members 43, radiator 44, engine 45, steering-shaft assembly 46 and dash 47 with instruments. Associated with the engine, but not visible in Figure 5 is the transfer case 71 to which the front and rear drive shafts 54 and the propeller shaft 37 are eventually connected. The gas tank 75 (shown dotted so as not to impede the view) and shroud assembly 78 are also attached.

Figure 6:
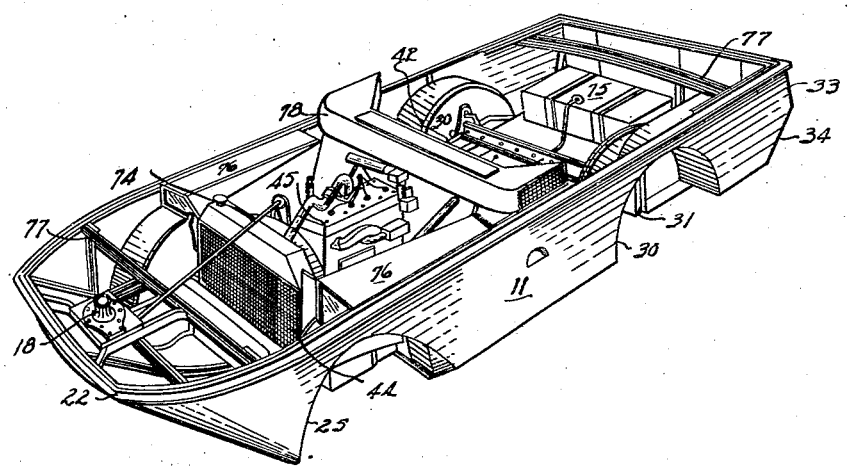

These two basic elements—namely, the hull 11 and the frame 51—are then assembled as shown in Figure 6 so that the various openings 38, 39 and 40 are adjacent the transfer case 71. After the assembly of frame and hull, the capstan 18 and drive 74, cooling air ducts 76 and deck stringers 77 are installed.

Figure 7:
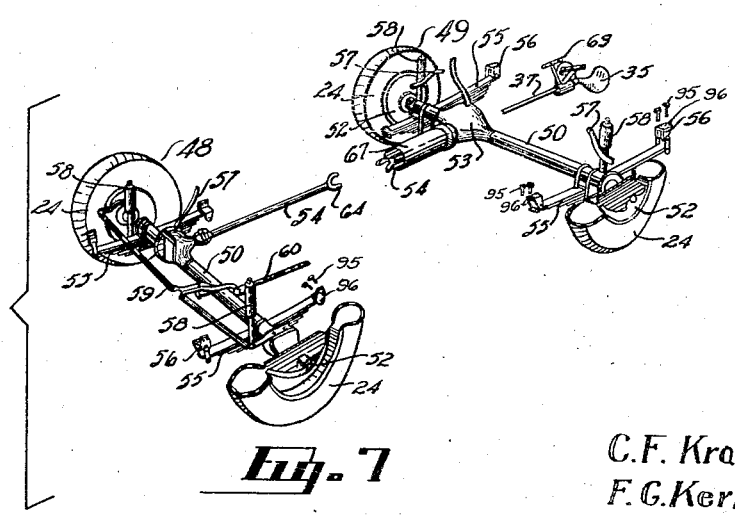

Figure 7 shows the running gear 21 which is independently assembled in front and rear sections 48 and 49. These each include an axle 50, wheels 52 with hydraulic brake attachment 57, differential 53 with associated drive shaft 54 and springs 55 having spring shackles 56 and shock absorbers 58. In addition, the front section running gear 48 has a conventional steering mechanism 59 operating through the drag link 60 to the steering arm 62. Also properly considered as part of the running gear is the propeller shaft 37, the propeller 35 and the strut 63.

The hull and frame assembly may now be brought together with the running gear, in which case the spring shackles 56 engage spring perches placed in the proper position in the hull and frame assembly and are bolted thereto as by bolts 95 passing through the holes 96 in the shackles 56 and suitable co-operating holes 97 on the spring perches on the frame 51 (see Figs. 5 and 7). Inasmuch as these are rigidly secured, proper provision to prevent leakage may be readily effected. At the same time, the front and rear drive shafts 54 are extended in the respective wells 27 and 29 and the universal joint connection 64 is made with the front and rear power take-off of the transfer case 71. Similarly, the propeller shaft is run through the stuffing box 40 and the inner end engaged with the appropriate power take-off in the transfer case, while the strut 63 is secured to the hull inside the propeller tunnel 32. It will thus be noted that the running gear has been attached to the hull and frame assembly through a minimum number of holes required at the spring perches and these are properly waterproofed.

However, as the front and rear axles are both sprung, provision must be made in the drive shaft to permit the oscillation of these members in a vertical plane; and, as the steering drag link 60 must also move fore and aft, similar provision must be made for leading it through the hull while preventing leakage. Both of the drive shafts are treated in substantially the same manner, which may be understood by referring to Figures 2, 7 and 8. As shown in the last, with respect to the rear drive shaft 54, ears 65 are rigidly attached to the transfer case and to these is pivotally secured through similar ears 66 a tube 67 which is thus free to swing up and down with respect to the hull. The tube 67 extends rearwardly to the differential 53 and is rockably supported on collar 79 and is attached to the differential and waterproofed by means of a rubber sleeve 68. Similarly, the forward end of the tube 67 makes a watertight connection with the hull around the drive shaft port 39 by means of another sleeve 69. It is apparent that as the rear axle moves in the vertical plane, the tube 67 may follow this movement and differences in radial position are freely permitted by relative movement between tube 67 and supporting ring 80 of collar 79 but does not, of course, rotate with the drive shaft 54. It is thus comparatively easy to waterproof the connections between the tube and the hull and the tube and the differential, respectively, and at the same time retain the necessary flexibility of operation. (Generally similar considerations govern the construction used in the forward drive shaft, insofar as the use of a tube is concerned, although it is not shown in detail.)

Provision is made for the fore-and-aft movement of the drag link 60 through a diaphragm gasket 70. The difficulty in waterproofing here is not great, since the link does not revolve as do the respective drive shafts. The propeller shaft stuffing box 40 is of the usual construction and need not be elaborated on.

To complete the craft, the deck plates 85 are secured in place. As best shown in Figure 3, the hull and rail construction 22 includes an angle plate 86, formed with a trough 87 paralleling the rail, and secured to the hull by welds 88. The trough 87 encloses a rubber gasket 89 which receives the flanged edge 90 of the deck plate 85 when the latter is secured in place by the bolt 91. This gives a particularly strong and waterproof construction, yet the deck plates are readily removable to give access to every part of the hull's interior.

In reviewing this method of construction, the advantages are manifest. First, the hull, frame and running gear may be constructed separately and independently. By this means the hull is made substantially imperforate, the only openings in it being those required for the various drives and for attachment at spring perches. By providing a frame, following the usual automotive practice, the hull is reinforced for marine work and at the same time the necessary strength is provided for land operation. By keeping the running gear entirely outside of the hull, the difficulties formerly encountered with leakage are avoided and the special means shown to waterproof these joints is responsible for much of the success of the structure. It also permits the use of standard truck components with consequent saving of both time and money.

Yet another feature which must be considered in vehicles of this sort is the provision to be made for cooling. While adequate water is available when the vehicle is in marine operation for cooling, it has been found preferable to rely on one cooling medium for both land and water operations. This of course requires a conventional radiator and cooling system to be used and this in turn requires that there be an adequate supply of cooling air available. This is easily obtained in land operation just as in the case of the ordinary vehicle. However, in marine operation, particularly in rough water, ports provided for the admission of cooling air would admit water and swamp the craft. Accordingly, a selectively operable cooling hatch 13 is shown which may be used safely under all conditions.

This is illustrated best in Figures 1 and 9 in which a cooling air hatch 13 is provided forward of the engine. This hatch is hinged at its rearward edge and opens upwardly and normally admits air as shown by the solid arrows in Figure 9 to and through the radiator 44, over the engine 45, and then through a conduit 72 adjacent the dash to a selective outlet port 81. However, in rough weather, the seas will break over the bow of the vehicle and it will be necessary to keep the hatch 13 closed. This is accomplished by means of a linkage 82 which interconnects the hatch 13 and the selective outlet port 81. Thus, when the hatch 13 is closed, the outlet port 81 to the exterior of the vessel is also closed and the inner port 83 is opened, permitting air to be drawn from the cockpit as indicated by the dotted arrows around the hull through ducts 76 to a position in front of the radiator from which it is forced rearwardly and exhausts through an inner exhaust 84 immediately behind the windshield 16. Although this raises the cockpit temperature considerably, it permits both the hatch 13 and the exterior port 81 to be closed and the cooling air obtained from the cockpit without risk of leakage into the craft. Despite the limited available air in this type of operation, it has been found that the vehicles can operate for a considerable period of time before the temperatures become unbearable. It will be understood, of course, that in normal operation, whether on land or in water, it is not necessary to resort to this expedient. The actual mechanism to effect this is shown diagrammatically since it may be carried out in different ways.

Some changes may be made in the arrangement, construction and combination of the various parts of the improved construction without departing from the spirit of the invention and it is the intention to cover by the claims such changes as may reasonably be claimed within the scope thereof.

The invention claimed is:

1. In an amphibious vehicle, a hull substantially rectangular in plan and having a substantially flat bottom, front and rear wheels mounted exteriorly of said hull, said hull having a forwardly raked flat bow section sloping obliquely upwardly from the bottom of said hull and extending between said front wheels, the plane of said bow section extended rearwardly being substantially tangent to the lower periphery of the front wheels of said vehicle.

2. The structure of claim 1 which is further characterized in that the counter of said hull is formed with a rearwardly raked flat stern section extending between said rear wheels, the plane of said stern section extended forwardly being substantially tangent to the lower periphery of the rear wheels of said vehicle.

3. In an amphibious vehicle, comprising, a hull having front and rear axles resiliently mounted exteriorly thereof, wheels on said axles, drive means between said axles and a source of motive power within said hull, a frame within said hull supporting said motive power source and being resiliently secured to said axles, an outwardly opening tunnel formed in said hull, a propeller in said tunnel, a shaft leading from said propeller to said source of motive power, and means to selectively operate said propeller or said wheels.

4. In an amphibious vehicle, a hull generally scow-shaped in conformation, transverse wells formed in said hull adjacent the front and rear thereof, wheel wells formed in said hull at the ends of said transverse wells, an axle disposed in each said transverse well, wheels at the ends of said axles disposed in said wheel wells, resilient means secured outside of said hull between said hull and said axles, a sloping forefoot extending upwardly and forwardly from the bottom of said hull from a line forwardly of said front wheel wells, an outwardly opening tunnel formed in said hull extending inwardly and downwardly from the transom of said hull, and a propeller disposed in said tunnel.

5. In an amphibious vehicle, a hull generally scow-shaped in conformation, transverse wells formed in said hull adjacent the front and rear thereof, wheel wells formed in said hull at the outer ends of said transverse wells, a frame comprising at least two substantially parallel side members connected by a plurality of cross members within said hull, an engine mounted on said frame, a front axle with associated wheels and steering linkage in said front wells outside said hull, a rear axle with associated wheels and a differential drive means in said rear wells outside said hull, and spring means secured to said axles and bearing against the exterior of said hull in positions corresponding to the location of said frame members in the interior of said hull, and fastening means extending through said frame and hull assembly and said spring means at said bearing positions.

6. The structure of claim 5 which is further characterized in that a connection from said steering linkage extends through a watertight opening in said hull to a steering control in the interior of said hull.

7. The structure of claim 5 which is further characterized in that a drive connection from said drive means on said rear axle extends through an opening in said hull to said engine, said drive connection being mounted for free movement in a vertical plane.

8. The structure of claim 5 which is further characterized in that a drive connection from said drive means on said rear axle extends through an opening in said hull to said engine, a waterproofing means surrounding said drive connection and flexibly attached to said drive means at one end and to said hull at the other end, said axle and drive means and drive connection and waterproofing means being mounted for free movement in a vertical plane.

9. The structure of claim 5 which is further characterized in that said front axle includes a drive means, drive connections from said drive means on said front axle and said rear axle extending therefrom through respective openings in said hull to said engine, waterproofing means surrounding said drive connections and flexibly attached to said respective drive means at one end and to said hull adjacent said respective opening at the other end, said axles and associated drive means and drive connections and waterproofing means being mounted for free movement in a vertical plane, and a connection from said steering linkage extending through a watertight opening in said hull to a steering control in the interior of said hull.

CLARENCE F. KRAMER.
FLOYD G. KERBY.